No. 740,976. PATENTED OCT. 6, 1903.
M. P. GERBING.
CAR AXLE AND WHEEL.
APPLICATION FILED OCT. 15, 1902.
NO MODEL.

Witnesses
Bernard M. Offutt
W. F. Crowley

Inventor
Max P. Gerbing
By David W. Moore
Attorney

No. 740,976. Patented October 6, 1903.

UNITED STATES PATENT OFFICE.

MAX P. GERBING, OF WENTWORTH, MISSOURI.

CAR AXLE AND WHEEL.

SPECIFICATION forming part of Letters Patent No. 740,976, dated October 6, 1903.

Application filed October 15, 1902. Serial No. 127,376. (No model.)

*To all whom it may concern:*

Be it known that I, MAX P. GERBING, a citizen of the United States, residing at Wentworth, in the county of Newton and State of Missouri, have invented certain new and useful Improvements in Car Axles and Wheels, of which the following is a specification.

This invention relates to improvements in car axles and wheels; and the main object of my invention is the provision of an axle upon which is rigidly secured a wheel, so that any lateral movement thereon will be prevented, as well as any rotary motion, said wheel being provided with a novel hub-body and a detachable tread.

To attain these objects, the invention consists of a car-axle embodying novel features of construction, substantially as disclosed herein.

Figure 1:
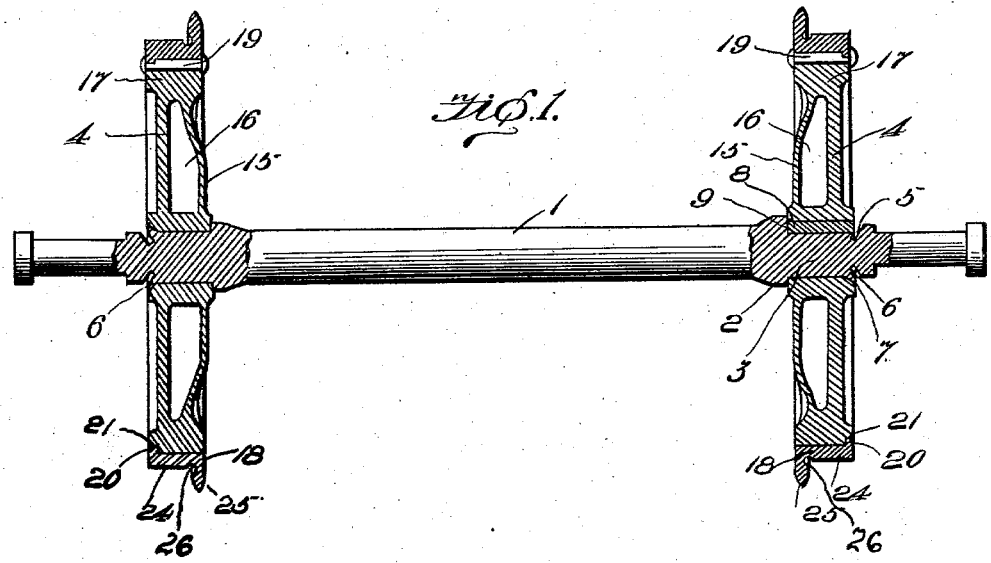
Figure 2:
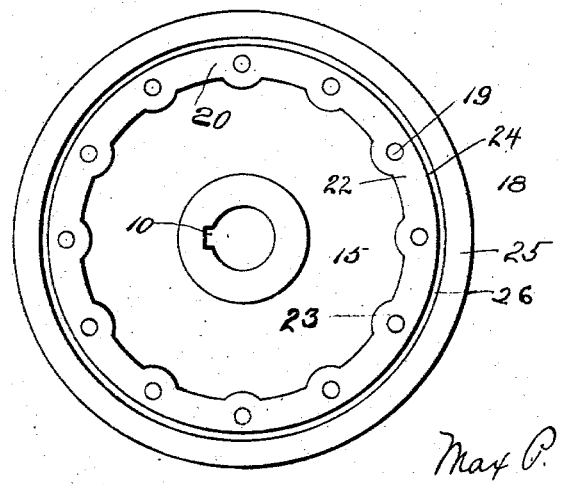

In the accompanying drawings, Figure 1 is a horizontal sectional view through two portions of the axle at its connection with the two wheels. Fig. 2 is a side elevation of my improved wheel.

Referring to the drawings, the numeral 1 designates an axle, which is provided with a shoulder 2 and a cylindrical portion 3, upon which is mounted the car-wheel 4, said cylindrical portion being provided with the inclined groove 5, which provides a flange 6, which is adapted to be bent upward to engage the outer flaring mouth 7 of the car-wheel. This flange prevents the lateral displacement of the wheel, while the key 8, which enters the grooves 9 and 10 of the axle and wheel, respectively, secures the wheel rigidly upon the axle. The wheel 4 consists, substantially, of the integral circular disk 15, which is cast so as to have the hollow annular space 16 surrounding the hub and tapering toward the intermediate rim 17. This form of intermediate rim 17 is provided with an outer surface to receive the detachable tread or rim 18, which is secured in place by means of the bolts 19, and also the flange 20, which fits in the recess 21 of the rim 17. This tread or rim 18 consists, substantially, of the flat projecting circular rim 22, provided with the eyed lug 23, the plane surface 24, which engages the track, and with the flange 25. At the junction of the flange 25 and surface 24 I provide a peripheral groove 26, which prevents the wear upon the inner edge of the track-rails.

From the foregoing description, taken in connection with the drawings, it is evident that I provide a novel construction of car axle and wheel, the connection between the same being so constructed as to cause the wheel to be rigidly locked against rotary or lateral movement, thus practically producing an integral wheel and axle.

What I claim as new, and desire to secure by Letters Patent, is—

1. In combination with a car-axle having an inclined flange cut from the body thereof to form an annular groove at the base of the flange, of a car-wheel adapted to fit on the axle and held from lateral displacement by the flange.

2. In combination with an axle having a groove in each end thereof, and a riveting-flange adjacent to the groove, of a car-wheel comprising a hub having a central opening with a flaring mouth which is adapted to receive the riveting-flange to hold the wheel on the axle, an intermediate rim for the wheel, and a detachable tread secured to said intermediate rim.

3. In combination with an axle having a recess in each end and a riveting-flange adjacent to the recess, of a wheel comprising a central hub having an annular opening with a flaring outer mouth and a recess in the hub upon the inner side of the opening, said riveting-flange being adapted to fit in the flaring mouth to prevent the lateral displacement of the wheel, a key to engage the axle and the recess of the hub to cause the wheel to revolve with the axle, a wheel-body carrying the hub, a detachable tread secured to said wheel-body, and a flange carried by said tread.

In testimony whereof I affix my signature in presence of witnesses.

MAX P. GERBING.

Witnesses:
F. C. JOHNSTON,
GEO. A. GERBING,
W. A. TOWNES.